(12) United States Patent
Ding et al.

(10) Patent No.: US 10,341,093 B2
(45) Date of Patent: Jul. 2, 2019

(54) METHOD, APPARATUS AND SYSTEM FOR DEVICE IDENTIFICATION

(71) Applicant: BAIDU ONLINE NETWORK TECHNOLOGY (BEIJING) CO., LTD., Beijing (CN)

(72) Inventors: Yu Ding, Beijing (CN); Tao Wei, Beijing (CN); Yulong Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 221 days.

(21) Appl. No.: 15/618,453

(22) Filed: Jun. 9, 2017

(65) Prior Publication Data
US 2018/0152293 A1 May 31, 2018

(30) Foreign Application Priority Data
Nov. 15, 2016 (CN) .......................... 2016 1 1030194

(51) Int. Cl.
*H04L 29/06* (2006.01)
*H04L 9/08* (2006.01)
(Continued)

(52) U.S. Cl.
CPC ............... *H04L 9/0825* (2013.01); *G06F 7/58* (2013.01); *H04L 9/0866* (2013.01); *H04L 9/30* (2013.01);
(Continued)

(58) Field of Classification Search
None
See application file for complete search history.

(56) References Cited

U.S. PATENT DOCUMENTS

| 7,409,552 | B2 * | 8/2008 | Buttyan | G06Q 20/20 |
| | | | | 713/172 |
| 2003/0026428 | A1 * | 2/2003 | Loisel | H04L 63/061 |
| | | | | 380/277 |

(Continued)

FOREIGN PATENT DOCUMENTS

| CN | 101873331 A | 10/2010 |
| CN | 102131188 A | 7/2011 |

OTHER PUBLICATIONS

Huang et al. (2015) "An investigation of argumenting speaker representations to improve speaker normalisation for DNN based speech recognition," ICASSP 2015, 4 pp.

(Continued)

*Primary Examiner* — Shin-Hon (Eric) Chen
(74) *Attorney, Agent, or Firm* — Lathrop Gage LLP

(57) ABSTRACT

The present disclosure discloses a method, an apparatus and a system for device identification. A specific implementation of the method comprises: receiving a device identification request sent from a terminal device, the device identification request comprising a current user identifier of a current user of the terminal device; acquiring a public key in a preset asymmetric key pair to serve as a first public key; sending the first public key and a randomly-generated first random number to the terminal device; receiving device characteristic information sent from the terminal device, the device characteristic information being generated by the terminal device based on the current user identifier, the first public key, the first random number and a device identifier of the terminal device; and identifying the terminal device based on the current user identifier, the first random number and the device characteristic information.

13 Claims, 10 Drawing Sheets

(51) Int. Cl.
*H04W 12/06* (2009.01)
*G06F 7/58* (2006.01)
*H04L 9/30* (2006.01)
*G06F 21/44* (2013.01)

(52) U.S. Cl.
CPC ........ H04L 63/0442 (2013.01); H04L 63/067 (2013.01); H04L 63/08 (2013.01); H04L 63/083 (2013.01); H04L 63/0807 (2013.01); H04L 63/0876 (2013.01); H04W 12/06 (2013.01); *G06F 21/44* (2013.01); *H04L 2209/42* (2013.01)

(56) References Cited

U.S. PATENT DOCUMENTS

| | | | | |
|---|---|---|---|---|
| 2006/0117175 | A1* | 6/2006 | Miura | G06F 21/445 713/155 |
| 2012/0159167 | A1* | 6/2012 | Lee | H04L 9/321 713/168 |
| 2013/0170643 | A1* | 7/2013 | Xiao | H04L 63/08 380/270 |
| 2015/0089621 | A1* | 3/2015 | Khalid | H04L 63/08 726/9 |
| 2017/0331893 | A1* | 11/2017 | Crofton | H04L 67/1097 |
| 2017/0364911 | A1* | 12/2017 | Landrok | G06Q 20/3825 |
| 2018/0285602 | A1* | 10/2018 | Mersh | G06F 21/33 |

OTHER PUBLICATIONS

Shi et al. (2015) "Contextual spoken language understanding using recurrent neural networks," ICASSP 2015, 5 pp.

Stuhlsatz et al. (2011) "Deep neural networks for acoustic emotion recognition raising the benchmarks," ICASSP 2011, 4 pp.

Olive (1999) "Institute of electrical and electronics engineers the voice user interface," Globecom '99, 5 pp.

Rao (2011) "Role of neural network models for developing speech systems," Sadhana, vol. 36, Part 5, 54 pp.

Fujimura (2014) "Simultaneous Gender Classification and Voice Activity Detection Using Deep Neural Networks," Interspeech 2014, 5 pp.

Serizel (2014) "Vocal tract length normalisation approaches to DNN based children's and adults' speech recognition," 2014 IEEE, 6 pp.

Chinese Patent Application No. 201611030194.5; First Office Action dated Jan. 17, 2018, including English translation—25 pages.

* cited by examiner

US 10,341,093 B2

METHOD, APPARATUS AND SYSTEM FOR DEVICE IDENTIFICATION

CROSS-REFERENCE TO RELATED APPLICATION

This application is related to and claims priority from Chinese Application No. 201611030194.5, filed on Nov. 15, 2016 and entitled "Method, Apparatus and System for Device Identification", the entire disclosure of which is hereby incorporated by reference.

TECHNICAL FIELD

The present disclosure relates to the field of computer technologies, particularly to the field of Internet technologies, and more particularly to a method, an apparatus and a system for device identification.

BACKGROUND

Devices generate and send device characteristics to servers, so that the servers use the received device characteristics and relevant user information for device identification. At present, most of mainstream device identification methods generate device identifiers on the device side based on simple hardware/software environment characteristics, and then identify devices through recording these device identifiers on server sides.

However, device identification methods in the prior art have the following disadvantages. First, attackers may hijack network messages or system calls to steal device identifiers on networks or in operating systems. Thus, user identities may be falsified, which causes loss to the device users. Second, no characteristic of applications installed in the devices is considered by these methods. Device identities captured by the applications are the same, and therefore, there is a risk of information leakage.

SUMMARY

An objective of the present disclosure is to provide an improved method, apparatus and system for device identification, in order to solve the technical problem mentioned in the foregoing Background section.

In a first aspect, the present disclosure provides a server-implemented method for identifying a device. The method comprises: receiving a device identification request sent from a terminal device, the device identification request comprising a current user identifier of a current user of the terminal device; acquiring a public key in a preset asymmetric key pair to serve as a first public key; sending the first public key and a randomly-generated first random number to the terminal device; receiving device characteristic information sent from the terminal device, the device characteristic information being generated by the terminal device based on the current user identifier, the first public key, the first random number and a device identifier of the terminal device; and identifying the terminal device based on the current user identifier, the first random number and the device characteristic information.

In some embodiments, the device identification request further comprises a identification type identifier used for indicating a device identification type of the terminal device in the server. The identifying the terminal device based on the current user identifier, the first random number and the device characteristic information comprises: identifying the terminal device based on the device identification type of the terminal device, the current user identifier, the first random number and the device characteristic information.

In some embodiments, the identifying the terminal device based on the current user identifier, the first random number and the device characteristic information comprises: resolving the device characteristic information to obtain a user identifier and a random number; determining whether the user identifier obtained by resolving is identical to the current user identifier and whether the random number obtained by resolving is identical to the first random number; and generating a identification result indicating a failed identification for the device identification request, in response to determining that the user identifier obtained by resolving is different from the current user identifier and/or the random number obtained by resolving is different from the first random number.

In some embodiments, the resolving the device characteristic information to obtain a user identifier and a random number comprises: resolving the device characteristic information by using a preset asymmetric decryption algorithm and a private key in the preset asymmetric key pair to obtain the user identifier, the random number and the device identifier.

In some embodiments, the identifying the terminal device based on the current user identifier, the first random number and the device characteristic information further comprises: identifying the terminal device based on the current user identifier, the first random number and the device identifier obtained by resolving, in response to determining that the user identifier obtained by resolving is identical to the current user identifier and the random number obtained by resolving is identical to the first random number.

In a second aspect, the present disclosure provides a terminal-implemented method for identifying a device. The method comprises: sending a device identification request to a server, the device identification request comprising a current user identifier of a current user of a terminal device; receiving a first public key and a first random number sent from the server, the first public key being acquired by the server from a preset asymmetric key pair, the first random number being randomly generated by the server; acquiring a device identifier of the terminal device; generating device characteristic information based on the current user identifier, the first public key, the first random number and the device identifier; and sending the device characteristic information to the server, so that the server identifies the terminal device based on the current user identifier, the first random number and the device characteristic information.

In some embodiments, the device identification request further comprises a identification type identifier used for indicating a device identification type of the terminal device in the server. The generating device characteristic information based on the current user identifier, the first public key, the first random number and the device identifier comprises: generating the device characteristic information based on the device identification type of the terminal device, the current user identifier, the first public key, the first random number and the device identifier.

In some embodiments, the generating the device characteristic information based on the device identification type of the terminal device, the current user identifier, the first public key, the first random number and the device identifier comprises: calculating a first digest value by utilizing a preset message digest algorithm based on the device identification type of the terminal device, the first public key and the device identifier; calculating a second digest value of the first digest value and the first random number by utilizing the preset message digest algorithm; encrypting the first digest value, the current user identifier and the first random number by using the first public key with a preset asymmetric encryption algorithm to obtain encrypted information; and combining the current user identifier, the second digest value and the encrypted information to generate the device characteristic information.

In a third aspect, the present disclosure provides an apparatus for identifying a device for a server. The apparatus comprises: a request receiving unit, configured to receive a device identification request sent from a terminal device, the device identification request comprising a current user identifier of a current user of the terminal device; an acquiring unit, configured to acquire a public key in a preset asymmetric key pair to serve as a first public key; a sending unit, configured to send the first public key and a randomly-generated first random number to the terminal device; an information receiving unit, configured to receive device characteristic information sent from the terminal device, the device characteristic information being generated by the terminal device based on the current user identifier, the first public key, the first random number and a device identifier of the terminal device; and a identifying unit, configured to identify the terminal device based on the current user identifier, the first random number and the device characteristic information.

In some embodiments, the device identification request further comprises a identification type identifier used for indicating a device identification type of the terminal device in the server. The identifying unit is further configured to: identify the terminal device based on the device identification type of the terminal device, the current user identifier, the first random number and the device characteristic information.

In some embodiments, the identifying unit comprises: a resolving module, configured to resolve the device characteristic information to obtain a user identifier and a random number; a determining module, configured to determine whether the user identifier obtained by resolving is identical to the current user identifier and whether the random number obtained by resolving is identical to the first random number; and a generating module, configured to generate a identification result indicating a failed identification for the device identification request, in response to determining that the user identifier obtained by resolving is different from the current user identifier and/or the random number obtained by resolving is different from the first random number.

In some embodiments, the resolving module is further configured to: resolve the device characteristic information by using a preset asymmetric decryption algorithm and a private key in the preset asymmetric key pair to obtain the user identifier, the random number and the device identifier.

In some embodiments, the identifying unit further comprises: a identifying module, configured to identify the terminal device based on the current user identifier, the first random number and the device identifier obtained by resolving, in response to determining that the user identifier obtained by resolving is identical to the current user identifier and the random number obtained by resolving is identical to the first random number.

In a fourth aspect, the present disclosure provides an apparatus for identifying a device for a terminal device. The apparatus comprises: a request sending unit, configured to send a device identification request to a server, the device identification request comprising a current user identifier of a current user of a terminal device; a receiving unit, configured to receive a first public key and a first random number sent from the server, the first public key being acquired by the server from a preset asymmetric key pair, the first random number being randomly generated by the server; an acquiring unit, configured to acquire a device identification of the terminal device; an information generating unit, configured to generate device characteristic information based on the current user identifier, the first public key, the first random number and the device identifier; and an information sending unit, configured to send the device characteristic information to the server, so that the server identifies the terminal device based on the current user identifier, the first random number and the device characteristic information.

In some embodiments, the device identification request further comprises a identification type identifier used for indicating a device identification type of the terminal device in the server. The information generating unit is further configured to: generate the device characteristic information based on the device identification type of the terminal device, the current user identifier, the first public key, the first random number and the device identifier.

In some embodiments, the information generating unit comprises: a first calculating module, configured to calculate a first digest value by utilizing a preset message digest algorithm based on the device identification type of the terminal device, the first public key and the device identifier; a second calculating module, configured to calculate a second digest value of the first digest value and the first random number by utilizing the preset message digest algorithm; an encrypting module, configured to encrypt the first digest value, the current user identifier and the first random number by using the first public key with a preset asymmetric encryption algorithm to obtain encrypted information; and a combining module, configured to combine the current user identifier, the second digest value and the encrypted information to generate the device characteristic information.

In a fifth aspect, the present disclosure provides a system for identifying a device. The system comprises a terminal device and a server. The server comprises the apparatus according to any embodiment of the third aspect, and the terminal device comprises the apparatus according to any embodiment of the fourth aspect.

According to the method and the apparatus for identifying a device for a server provided in the present disclosure, it is to receive a device identification request sent from a terminal device, the device identification request comprising a current user identifier of a current user of the terminal device; acquire a public key in a preset asymmetric key pair to serve as a first public key; send the first public key and a randomly-generated first random number to the terminal device; receive device characteristic information sent from the terminal device, the device characteristic information being generated by the terminal device based on the current user identifier, the first public key, the first random number and a device identifier of the terminal device; and identify the terminal device based on the current user identifier, the first random number and the device characteristic information. The current user identifier, the public key in the preset asymmetric key pair, the random number generated by the server and the device identifier of the terminal device are used in the process of device identification, so that the difficulty in intercepting the device characteristic information of the terminal device by attackers is increased, and the security of accessing the server by the terminal device is enhanced.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
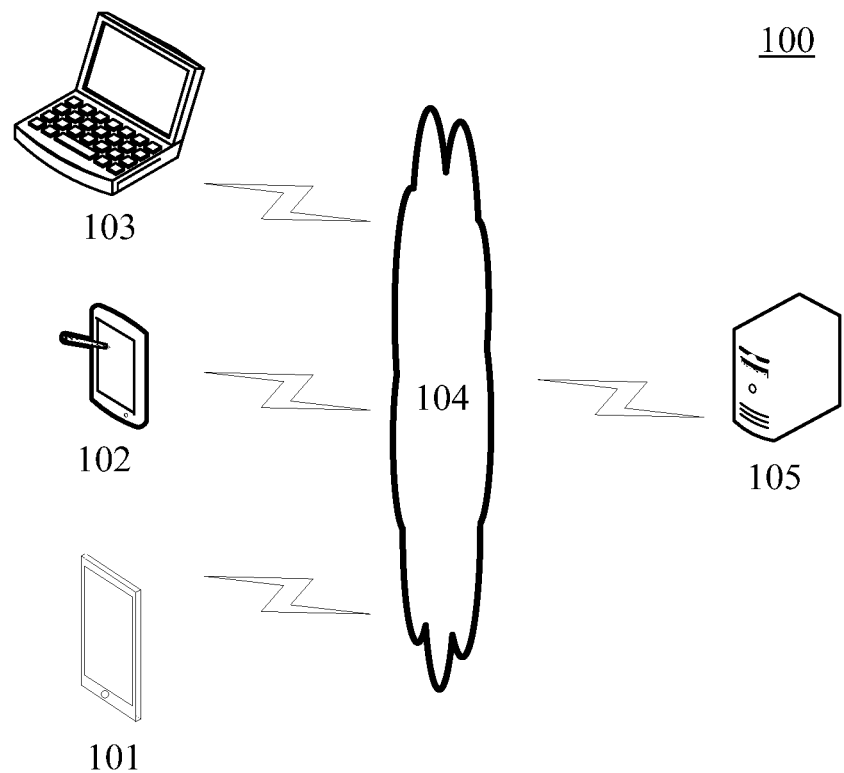
FIG. 1 is an exemplary architecture diagram of a system to which the present disclosure may be applied.

FIG. 1 shows an exemplary architecture of a system 100 to which the server-implemented or terminal-implemented method for identifying a device and the apparatus for identifying a device for a server or terminal device according to embodiments of the present application may be applied.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless communication links, or optical fibers.

The user may use the terminal devices 101, 102 and 103 to interact with the server 105 through the network 104, in order to transmit or receive messages, etc. The terminal devices 101, 102 and 103 may be installed with various client applications, such as an application for identifying a terminal device, a webpage browser application, a shopping application, a search application, an instant messaging tool, a mail client, and social platform software. The terminal device may send a device identification request to the server, generate the device identification information after receiving the first public key and the first random number sent from the server, and then send the device identification information to the server.

The target devices 101, 102, and 103 may be various electronic devices having a display screen and including but not limited to, a smart phone, a tablet computer, a laptop portable computer, a desktop computer, and the like.

The server 105 may be a server providing various services, for example, a background server for supporting the application for identifying a terminal device for a server installed on the terminal devices 101, 102, and 103. The background server may perform processing, such as analysis, on the received data (such as the device identification request), and output the analysis result (for example, the first public key and the first random number) to the terminal device.

It should be noted that the server-implemented method for identifying a device according to the embodiments of the present application may be executed by the server 105. Accordingly, the apparatus for identifying a device for a server may be set in the server 105. And, the terminal-implemented method for identifying a device according to the embodiments of the present application may be executed by the terminal devices 101, 102, and 103. Accordingly, the apparatus for identifying a device for a terminal device may be set in the terminal devices 101, 102, and 103.

It should be appreciated that the numbers of the terminal devices, the network and the server in FIG. 1 are merely illustrative. Any number of terminal devices, networks and servers may be provided based on the actual requirements.

Referring to FIG. 2, a flow 200 of a method for identifying a terminal device of a server according to an embodiment of the present disclosure is illustrated. The method for identifying a terminal device of a server in this embodiment comprises following steps.

Step 201: receiving a device identification request sent from a terminal device.

In this embodiment, an electronic device (for example, the server as shown in FIG. 1) on which the method for identifying a terminal device of a server runs may receive a device identification request from the terminal device by way of wired connection or wireless connection, wherein the device identification request comprises a current user identifier of a current user of the terminal device. Here, the current user identifier of the terminal device may be a user identifier of a logged user, or may be a user identifier of a user who has entered a username but not logged in.

In some optional implementations of this embodiment, when the current user identifier of the terminal device is the user identifier of a logged user, the device identification request may comprise an interactive session identification, and the session identification comprises the current user identifier.

In some optional implementations of this embodiment, when the current user identifier of the terminal device is the user identifier of an unlogged user, the device identification request may comprise the current user identifier.

It should be noted that the above wireless connection manner may comprise but not limited to 3G/4G connection, WiFi connection, Bluetooth connection, WiMAX connection, Zigbee connection, ultra wideband (UWB) connection and other present known or future developed wireless connection manners.

Step 202: acquiring a public key in a preset asymmetric key pair to serve as a first public key.

In this embodiment, the electronic device (such as the server as shown in FIG. 1) may be provided with an asymmetric key pair, so that the electronic device may locally acquire the public key in the asymmetric key pair to serve as the first public key.

In some optional implementations of this embodiment, the electronic device (such as the server as shown in FIG. 1) may be a server for supporting designated function parts (such as an AA means of payment) in applications installed on the terminal device, so that the asymmetric key pair preset on the electronic device is the asymmetric key pair preset for the designated function parts and used for performing asymmetric encryption/decryption.

In some optional implementations of this embodiment, the electronic device (such as the server as shown in FIG. 1) also may be a server for supporting a plurality of function parts in different applications installed on the terminal device, so that the asymmetric key pair for each function part is preset on the electronic device. Accordingly, the device identification request also comprises identifications for differentiating different function parts, so that the electronic device acquires the public key in the asymmetric key pair corresponding to the identifications for differentiating different function parts to serve as the first public key.

Step 203: sending the first public key and a randomly-generated first random number to the terminal device.

In this embodiment, after acquiring the first public key in Step 202, the electronic device first adopts various methods to randomly generate a random number to serve as the first random number, and then sends the first public key and the random number to the terminal device so that the terminal device generates device characteristic information.

As an example, the method for randomly generating a random number may adopt a linear congruential method. The method for generating a random number using the linear congruential method is a well-known technology widely studied and used at present, which is not repeated any more herein.

In some optional implementations of this embodiment, the first random number may be a number used once or number once (Nonce) in cryptography, that is, the random number may be an arbitrary or non-repetitive random number value only used once. The Nonce plays an important role in an initial vector and a cryptographic hash function in encryption technology. In communication applications of various authentication protocols, it is ensured that authentication information is not reused to be against replay attack. It is to be noted that the method for generating a random number Nonce in cryptography is a well-known technology widely studied and used, which is not repeated any more herein.

Step 204: receiving device characteristic information sent from the terminal device.

In this embodiment, the electronic device may receive the device characteristic information sent by the terminal device for use by a terminal identifying device subsequently. The device characteristic information is generated by the terminal device according to the current user identifier, the first public key, the first random number and a device identifier of the terminal device.

Step 205: identifying the terminal device based on the current user identifier, the first random number and the device characteristic information.

In this embodiment, after receiving the device characteristic information sent by the terminal device, the electronic device may identify the terminal device according to the current user identifier, the first random number and the device characteristic information.

In some optional implementations of this embodiment, the device identification request further comprises a identification type identifier, wherein the identification type identifier is used for indicating a device identification type, in the electronic device (such as the server as shown in FIG. 1), of the terminal device. In this way, the electronic device identifies the terminal device according to the device identification type of the terminal device, the current user identifier, the first random number and the device characteristic information.

In some optional implementations of this embodiment, the identification type identifier may be in a digital form. For example, the digit 1 may be used to represent a first device identification type, the digit 2 may be used to represent a second device identification type, and the digit 3 may be used to represent a third device identification type. The identification type identifier also may be a character string. For example, the character string "FisrtType" is used to represent a first device identification type, the character string "SecondType" is used to represent a second device identification type, and the character string "ThirdType" is used to represent a third device identification type.

Figure 2A:
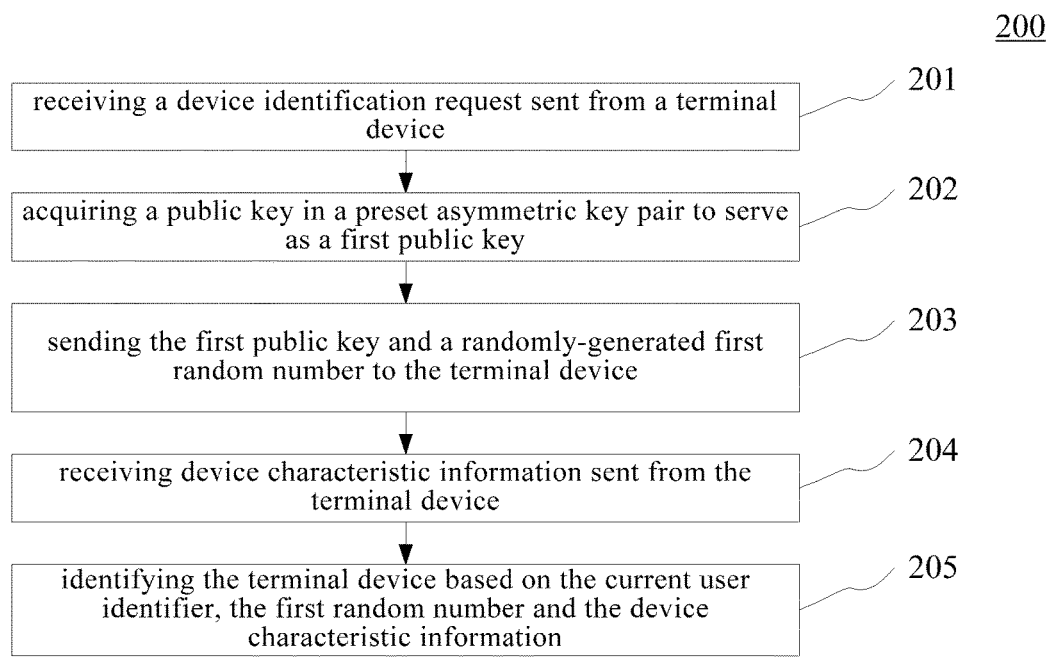
FIG. 2a, FIG. 2b, FIG. 2c and FIG. 2d are flowcharts of a method for identifying a device of a server according to an embodiment of the present disclosure.
Figure 2B:
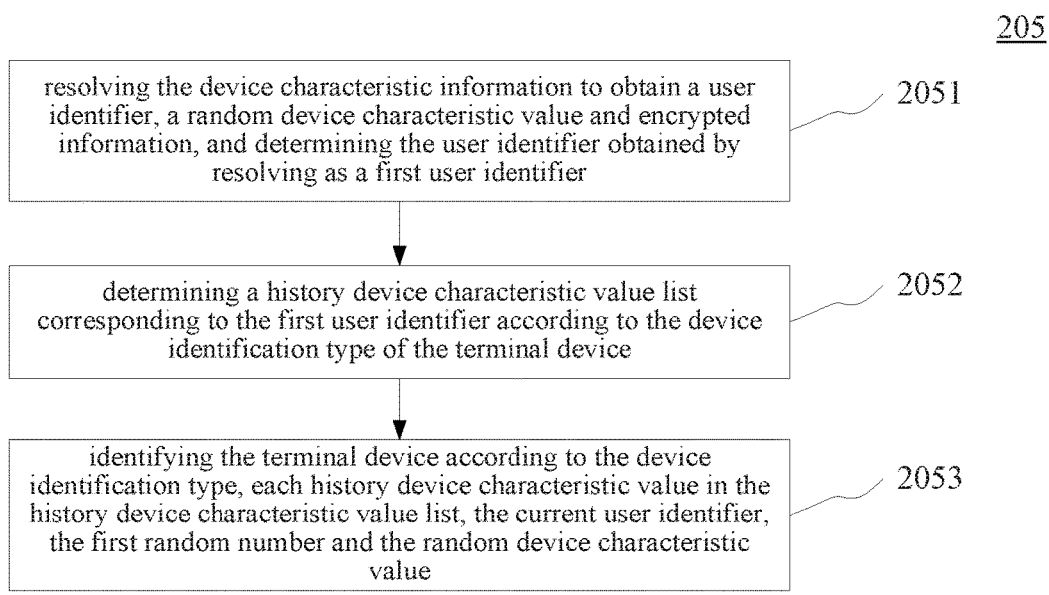

In some optional implementations of this embodiment, Step 205 may comprise the following substeps as shown in FIG. 2b.

Step 2051: resolving the device characteristic information to obtain a user identifier, a random device characteristic value and encrypted information, and determining the user identifier obtained by resolving as a first user identifier.

In this embodiment, the electronic device may resolve the device characteristic information received in Step 204 to obtain a user identifier, a random device characteristic value and encrypted information, and determine the user identifier obtained by resolving as the first user identifier. Herein, a method for resolving the device characteristic information may be set according to the method for generating the device characteristic information appointed between the electronic device and the terminal device. For example, when the device characteristic information is generated in accordance with the order from the user identifier, the random device characteristic value and the encrypted information, the device characteristic information is resolved also in accordance with the order from the user identifier, the random device characteristic value and the encrypted information.

Step 2052: determining a history device characteristic value list corresponding to the first user identifier according to the device identification type of the terminal device.

In this embodiment, the electronic device may determine the history device characteristic value list corresponding to the first user identifier according to the device identification type.

Figure 2C:
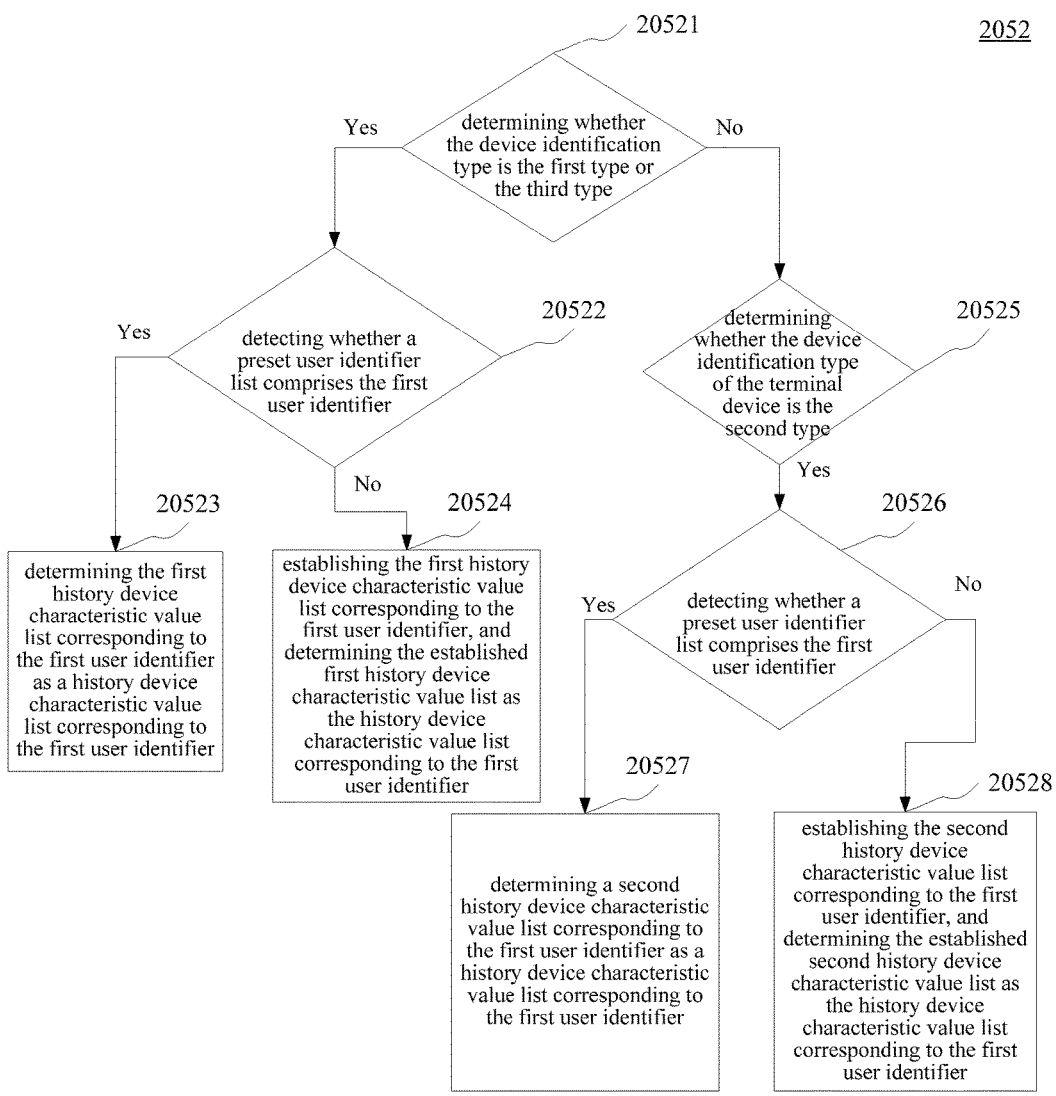

In some optional implementations of this embodiment, the device identification type of the terminal device may be any one of: a first type, a second type and a third type. Step 2052 may comprise following substeps as shown in FIG. 2c.

Step 20521: determining whether the device identification type is the first type or the third type, and going to Step 20522 if the device identification type is the first type or the third type.

Step 20522: detecting whether a preset user identifier list comprises the first user identifier, and going to Step 20523 if the preset user identifier list comprises the first user identifier, or otherwise going to Step 20524.

Step 20523: determining the first history device characteristic value list corresponding to the first user identifier as a history device characteristic value list corresponding to the first user identifier.

Step 20524: establishing the first history device characteristic value list corresponding to the first user identifier, and determining the established first history device characteristic value list as the history device characteristic value list corresponding to the first user identifier.

In some optional implementations of this embodiment, it is also permitted to go to Step 20525 when it is determined in Step 20521 that the device identification type of the terminal device is neither the first type nor the third type.

Step 20525: further determining whether the device identification type of the terminal device is the second type, and going to Step 20526 if the device identification type of the terminal device is the second type.

Step 20526: detecting whether a preset user identifier list comprises the first user identifier, and going to Step 20527 if the preset user identifier list comprises the first user identifier, or otherwise going to Step 20528.

Step 20527: determining a second history device characteristic value list corresponding to the first user identifier as a history device characteristic value list corresponding to the first user identifier.

Step 20528: establishing the second history device characteristic value list corresponding to the first user identifier, and determining the established second history device characteristic value list as the history device characteristic value list corresponding to the first user identifier.

Step 2053: identifying the terminal device according to the device identification type, each history device characteristic value in the history device characteristic value list, the current user identifier, the first random number and the random device characteristic value.

In this embodiment, the electronic device may identify the terminal device according to the device identification type, each history device characteristic value in the history device characteristic value list, the current user identifier, the first random number and the random device characteristic value.

Figure 2D:
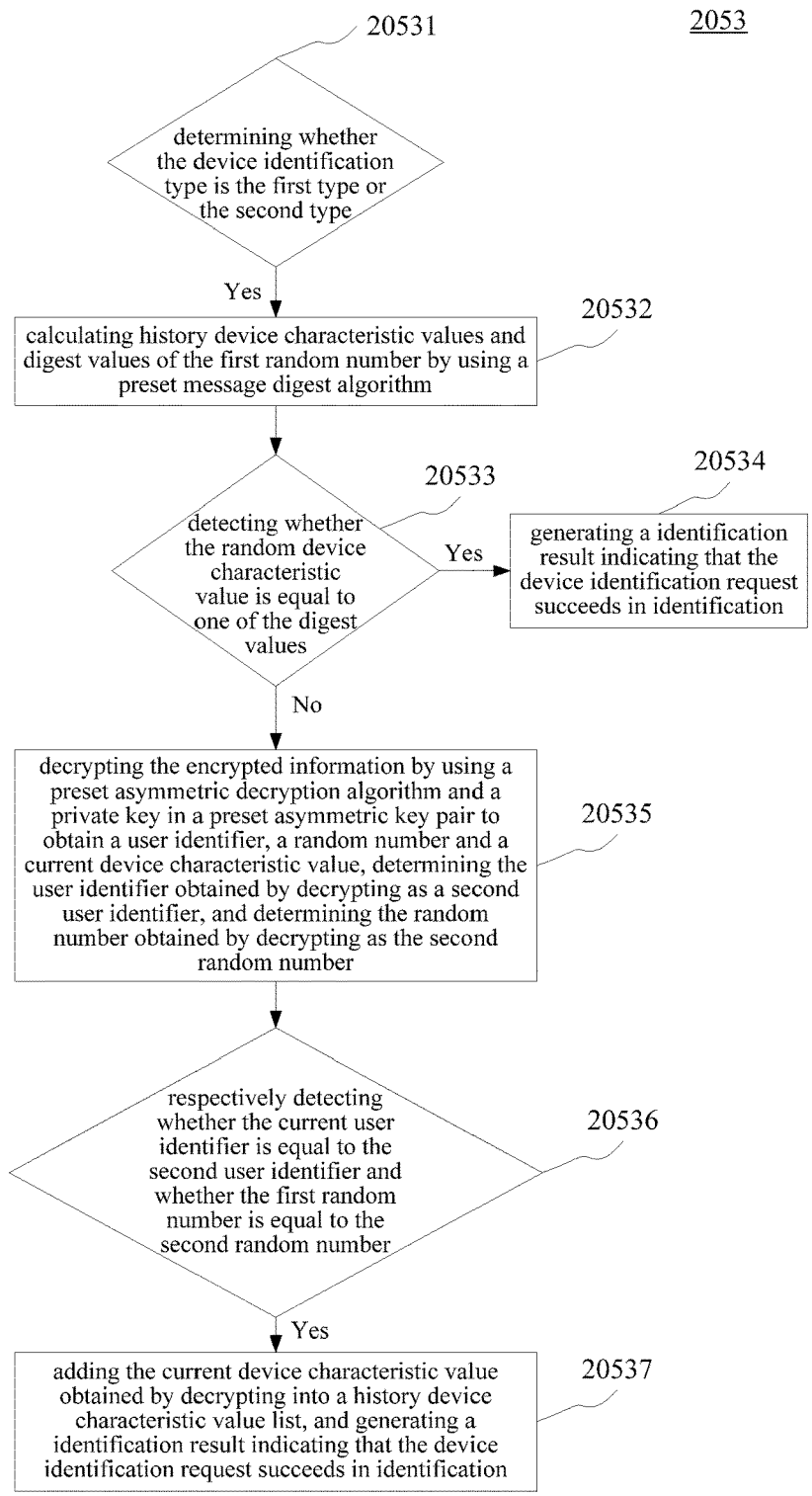

In some optional implementations of this embodiment, Step 2053 may further comprise the following substeps as shown in FIG. 2d.

Step 20531: determining whether the device identification type is the first type or the second type, and going to Step 20532 if the device identification type is the first type or the second type.

Step 20532: calculating history device characteristic values and digest values of the first random number by using a preset message digest algorithm.

Step 20533: detecting whether the random device characteristic value is equal to one of the digest values, and going to Step 20534 if the random device characteristic value is equal to one of the digest values.

Step 20534: generating a identification result indicating that the device identification request succeeds in identification.

In some optional implementations of this embodiment, it is also permitted to go to Step 20535 as described below when it is detected in Step 20533 that the random device characteristic value is not equal to each digest value.

Step 20535: decrypting the encrypted information by using a preset asymmetric decryption algorithm and a private key in a preset asymmetric key pair to obtain a user identifier, a random number and a current device characteristic value, determining the user identifier obtained by decrypting as a second user identifier, and determining the random number obtained by decrypting as the second random number.

Step 20536: respectively detecting whether the current user identifier is equal to the second user identifier and whether the first random number is equal to the second random number, and going to Step 20537 if the current user identifier is equal to the second user identifier and the first random number is equal to the second random number.

Step 20537: adding the current device characteristic value obtained by decrypting into a history device characteristic value list, and generating a identification result indicating that the device identification request succeeds in identification.

In some optional implementations of this embodiment, a identification result indicating that the device identification request fails in identification may be generated when in Step 20536 it is detected that the current user identifier is not equal to the second user identifier or the first random number is not equal to the second random number.

Figure 3:
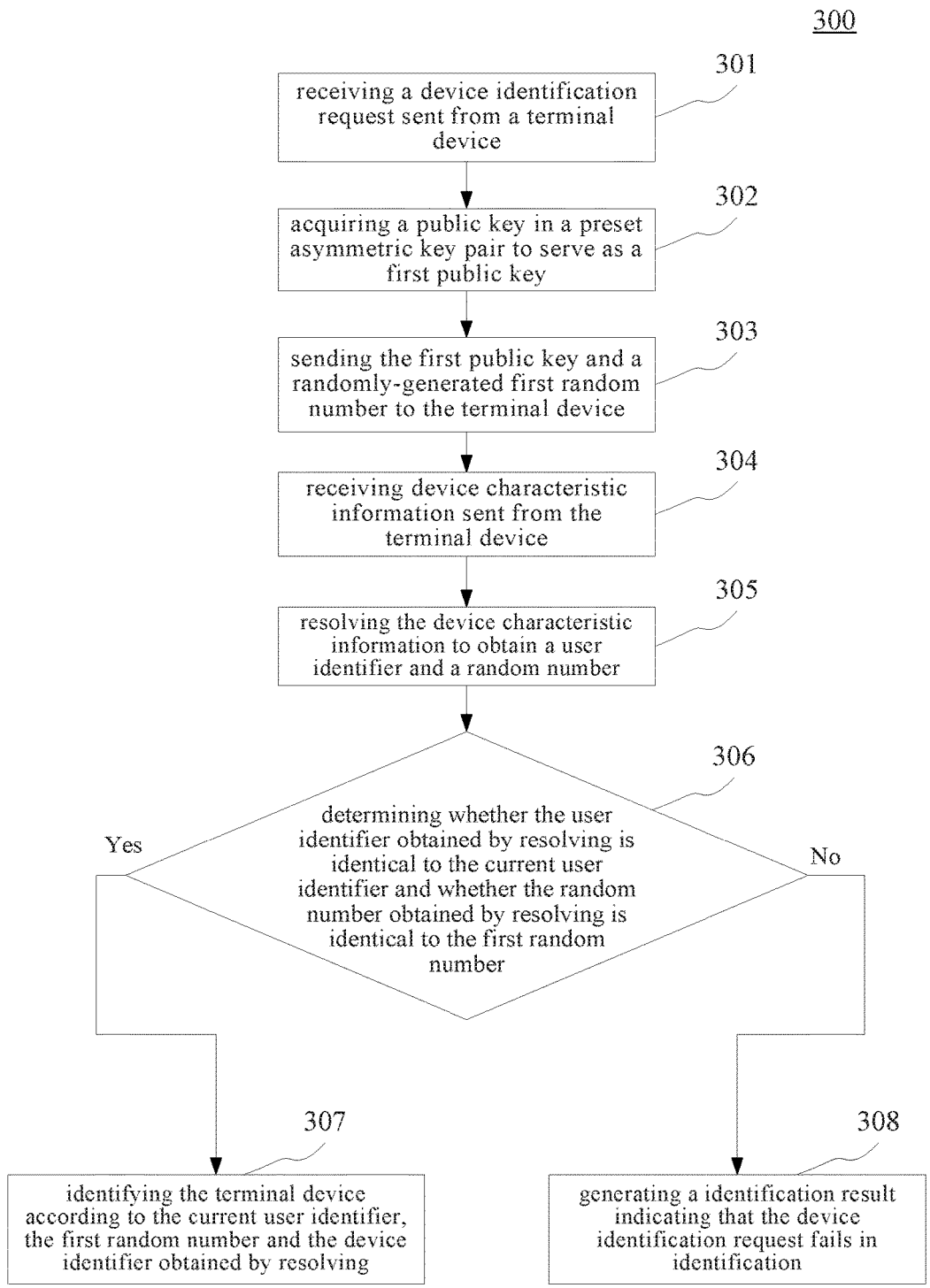
FIG. 3 is a flowchart of a method for identifying a device of a server according to another embodiment of the present disclosure.

Further referring to FIG. 3, a flow 300 of the method for identifying a terminal device of a server according to still another embodiments is illustrated. The method for identifying a terminal device of a server in this embodiment comprises following steps.

Step 301: receiving a device identification request sent from a terminal device.

Step 302: acquiring a public key in a preset asymmetric key pair to serve as a first public key.

Step 303: sending the first public key and a randomly-generated first random number to the terminal device.

Step 304: receiving device characteristic information sent from the terminal device.

Specific processes of Step 301, Step 302, Step 303 and Step 304 are basically identical to specific processes of Step 201, Step 202, Step 203 and Step 204 in the flow 200 as shown in FIG. 2a, and thus are not repeated any more herein.

Step 305: resolving the device characteristic information to obtain a user identifier and a random number.

In this embodiment, the electronic device may resolve the device characteristic information to obtain a user identifier and a random number. Herein, a method for resolving the device characteristic information may be set according to the method for generating the device characteristic information appointed between the electronic device and the terminal device.

In some optional implementations of this embodiment, the electronic device may resolve the device characteristic information by using a preset asymmetric decryption algorithm and a private key in the preset asymmetric key pair to obtain the user identifier and the random number.

Step 306: determining whether the user identifier obtained by resolving is identical to the current user identifier and whether the random number obtained by resolving is identical to the first random number, and going to Step 307 if the user identifier obtained by resolving is identical to the current user identifier and the random number obtained by resolving is identical to the first random number, or otherwise going to Step 308.

In this embodiment, after obtaining the user identifier and the random number obtained by resolving in Step 305, the electronic device may determine whether the user identifier obtained by resolving is identical to the current user identifier and whether the random number obtained by resolving is identical to the first random number. The subsequent identification step 307 may be continued when it is determined that the user identifier obtained by resolving is identical to the current user identifier and the random number obtained by resolving is identical to the first random number. The subsequent Step 308 of generating a failed identification result is gone to when it is determined that the user identifier obtained by resolving is not identical to the current user identifier and/or the random number obtained by resolving is not identical to the first random number.

Step 307: identifying the terminal device according to the current user identifier, the first random number and the device identifier obtained by resolving.

In this embodiment, the electronic device may identify the terminal device according to the current user identifier, the first random number and the device identifier obtained by resolving when it is determined in Step 306 that the user identifier obtained by resolving is identical to the current user identifier and the random number obtained by resolving is also identical to the first random number.

Step 308: generating a identification result indicating that the device identification request fails in identification.

In this embodiment, the electronic device may generate the identification result indicating that the device identification request fails in identification when it is determined in Step 306 that the user identifier obtained by resolving is not identical to the current user identifier and/or the random number obtained by resolving is not identical to the first random number.

Using the method provided by the above embodiments of the present disclosure, device characteristic information sent by a terminal device is resolved to obtain a user identifier and a random number, and then the terminal device is identified based on comparative results between the resolved user identifier and the random number and the current user identifier and the first random number. In this way, efficiency of server device identification is enhanced.

Figure 4:
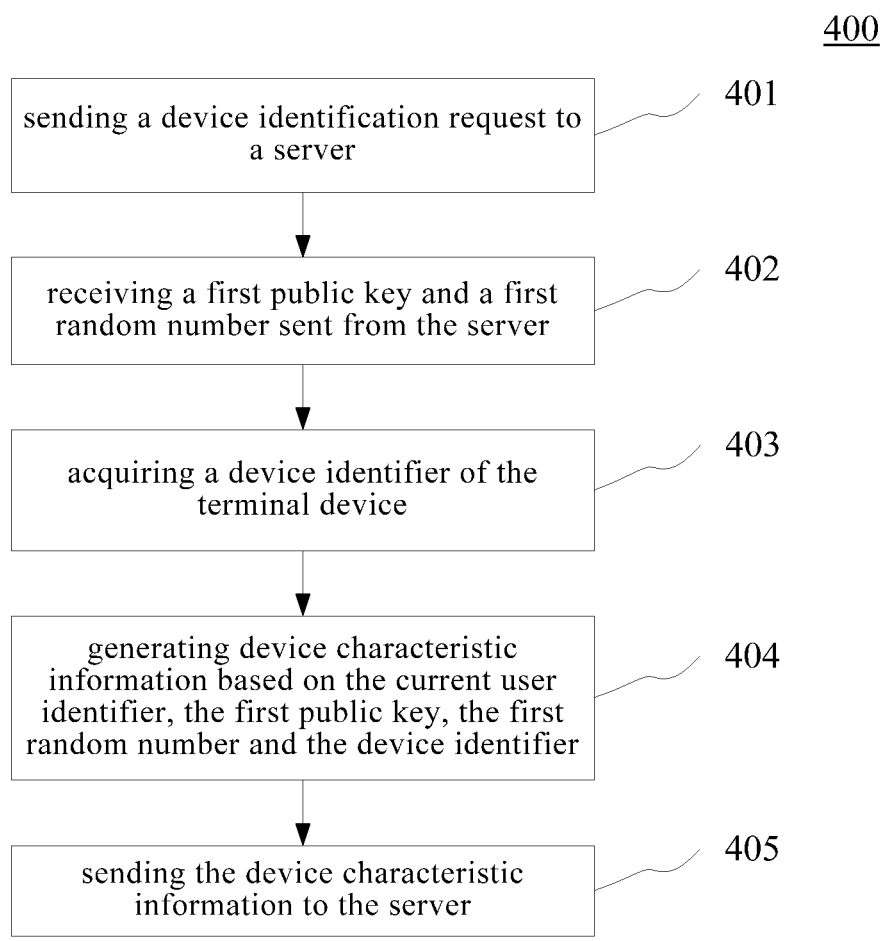
FIG. 4 is a flowchart of a method for identifying a device of a terminal device according to an embodiment of the present disclosure.

Further referring to FIG. 4, a flow 400 of a method for identifying a device of a terminal device according to an embodiments is illustrated. The flow 400 of the method for identifying a device of a terminal device comprises following steps.

Step 401: sending a device identification request to a server.

In this embodiment, an electronic device (such as the terminal devices 101, 102 and 103 in FIG. 1) on which the method for identifying a device of a terminal device may send a device identification request to a server (such as the server 105 in FIG. 1) by way of wired connection or wireless connection. The device identification request comprises a current user identifier of a current user of the terminal device.

It should be noted that the above wireless connection manner may comprise but not limited to 3G/4G connection, WiFi connection, Bluetooth connection, WiMAX connection, Zigbee connection, ultra wideband (UWB) connection and other present known or future developed wireless connection manners.

In some optional implementations of this embodiment, the terminal device may automatically send a device identification request to the server by means of a background when it is detected that a user executes a certain operation (for example, the user starts a specified application or uses an electronic shopping application to execute a payment operation) in a preset operation set.

In some optional implementations of this embodiment, when a server pushes information to a terminal device, the server may issue an instruction to the device, wherein the instruction instructs the terminal device to send a device identification request to the server.

Step 402: receiving a first public key and a first random number sent from the server.

In this embodiment, the electronic device may receive the first public key and the first random number sent by the server. The first public key is a public key acquired by the server from a preset asymmetric key pair, and the first random number is randomly generated by the server.

Step 403: acquiring a device identifier of the terminal device.

In this embodiment, after receiving the first public key and the first random number, the electronic device may acquire the device identifier of the terminal device (namely, the electronic device).

In some optional implementations of this embodiment, International Mobile Equipment Identity (IMEI) of the terminal device may be used as the device identifier of the terminal device.

In some optional implementations of this embodiment, a combination of hardware parameters of the terminal device may serve as the device identifier of the terminal device.

In some optional implementations of this embodiment, the terminal device also may be configured with a hardware device that may generate a unique device identification code, and a unique device identification code generated by the hardware device that may generate a unique device identification code is determined as the device identifier of the terminal device.

In some optional implementations of this embodiment, the terminal device also may be configured with a trusted computing environment (for example, a computing environment adopting TrustZone technologies), the hardware device that may generate a unique device identification code may be disposed in the terminal device, and the trusted computing environment of the terminal device is electrically connected to the hardware device that may generate a unique device identification code. In this way, the device identifier generated by the hardware device that may generate a unique device identification code may be acquired by means of the trusted computing environment of the terminal device. The method for acquiring the device identifier may ensure that the device identifier may be not intercepted by attackers. Thus security of device identifier may be enhanced.

In some optional implementations of this embodiment, the device identification request may further comprise a identification type identifier, wherein the identification type identifier is used for indicating a device identification type, in the server, of the terminal device. In this way, the electronic device may generate device characteristic information according to the device identification type of the terminal device, the current user identifier, the first public key, the first random number and the device identifier.

In some optional implementations of this embodiment, the device identification type of the terminal device may be any one of: a first type, a second type and a third type. As thus, the electronic device may acquire the device identifier of the terminal device according to following steps.

First, the electronic device may determine whether the device identifier of the terminal device is the third type.

Next, the device identifier of the terminal device is reset and the reset device identifier is acquired in response to determining the device identification type of the terminal device as the third type.

When the terminal device is configured with a hardware device that may generate a unique device identification code, a reset instruction may be sent by means of the hardware device that may generate a unique device identification code, so that the hardware device that may generate a unique device identification code generates a new unique device identification code to serve as the reset device identifier of the terminal device.

Step 404: generating device characteristic information based on the current user identifier, the first public key, the first random number and the device identifier.

In this embodiment, after acquiring the device identifier, the electronic device may generate device characteristic information according to the current user identifier, the first public key, the first random number and the device identifier.

In some optional implementations of this embodiment, the device identification request may further comprise a identification type identifier, wherein the identification type identifier is used for indicating a device identification type, in the server, of the terminal device. In this way, the electronic device may generate device characteristic information according to the device identification type of the terminal device, the current user identifier, the first public key, the first random number and the device identifier.

In some optional implementations of this embodiment, the electronic device generating the device characteristic information according to the device identification type of the terminal device, the current user identifier, the first public key, the first random number and the device identifier may comprise following steps.

First, a first digest value is obtained by calculating by utilizing a preset message digest algorithm according to the device identification type of the terminal device, the first public key and the device identifier.

Next, the first digest value and a second digest value of the first random number are calculated by utilizing the preset message digest algorithm.

To distinguish the first digest value from the second digest value, in the present disclosure, the first digest value is also referred to as a device characteristic value, and the second digest value is also referred to as a random device characteristic value.

Next, the first digest value, the current user identifier and the first random number are encrypted by using the first public key and by utilizing the preset asymmetric encryption algorithm to obtain encrypted information.

Finally, the current user identifier, the second digest value and the encrypted information are combined to generate the device characteristic information.

In some optional implementations of this embodiment, the electronic device obtaining a first digest value by calculating by utilizing a preset message digest algorithm according to the device identification type of the terminal device, the first public key and the device identifier may comprise following steps.

First, it is determined whether the device identification type of the terminal device is the first type or the third type.

Next, in response to determining the device identification type of the terminal device as the first type or the third type, the device identifier and the first digest value of the first public key are calculated by using the preset message digest algorithm, and the first digest value obtained by calculating is determined as the device feature value.

Next, in response to determining that the device identification type of the terminal device is neither the first type nor the third type, it is further determined whether the device identification type of the terminal device is the second type.

Finally, in response to determining that the device identification type of the terminal device as the second type, a preset second public key is acquired, the device identifier, the first public key and a digest value of the second public key are calculated by using the preset message digest algorithm, and the digest value obtained by calculating is determined as the device characteristic value.

In some optional implementations of this embodiment, the preset first public key may be different public keys set up for different services supported by the server. The preset second public key may be different public keys set up for different applications installed on the electronic device. As thus, when the device identification type of the terminal device indicated by the identification type identifier in the device identification request is the first type, using the device characteristic value generated by using the device identifier and the first public key may generate the same device characteristic value for the same service in different applications installed on the same terminal device and generate different device characteristic values for different services in the same application installed on the same terminal device. When the device identification type of the terminal device indicated by the identification type identifier in the device identification request is the second type, using the device characteristic value generated by using the device identifier, the first public key and the second public key may generate different device characteristic values for the same service in different applications installed on the same terminal device and generate different device characteristic values for different services in the same application installed on the same terminal device to adapt to requirements for identification of different device characteristics.

Step 405: sending the device characteristic information to the server.

In this embodiment, after generating the device characteristic information, the electronic device may send the device characteristic information to the server, so that the server identifies the terminal device according to the current user identifier, the first random number and the device characteristic information.

According to the method provided by the above embodiments of the present disclosure, the device identification request is sent to the server, device characteristic information is generated according to the current user identifier, the first public key and the first random number received from the server and the device identifier, and the generated device characteristic information is sent to the server, so that the server may identify the terminal device according to the current user identifier, the first random number and the device characteristic information. In this way, generating the device characteristic information based on the current user identifier, the first public key, the first random number and the device identifier is implemented, and security of the terminal device accessing the server is enhanced.

Figure 5:
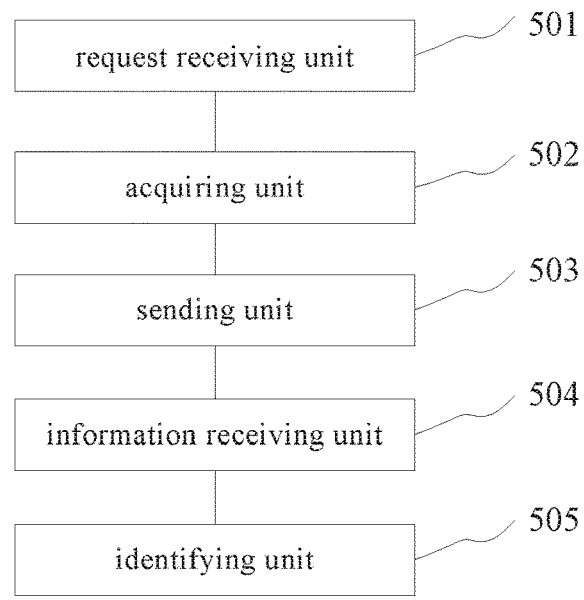
FIG. 5 is a schematic structural diagram of an apparatus for identifying a device of a server according to an embodiment of the present disclosure.

Further referring to FIG. 5, as an implementation of the method as shown in the foregoing figures, the present disclosure provides an embodiment of an apparatus for identifying a device of a server. The apparatus embodiment corresponds to the method embodiment as shown in FIG. 2, and the apparatus specifically may be used in various electronic devices.

As shown in FIG. 5, the apparatus 500 for identifying a device of a server described in this embodiment comprises: a request receiving unit 501, an acquiring unit 502, a sending unit 503, an information receiving unit 504 and a identifying unit 505. The request receiving unit 501 is configured to receive a device identification request sent from a terminal device, the device identification request comprising a current user identifier of a current user of the terminal device. The acquiring unit 502 is configured to acquire a public key in a preset asymmetric key pair to serve as a first public key. The sending unit 503 is configured to send the first public key and a randomly-generated first random number to the terminal device. The information receiving unit 504 is configured to receive device characteristic information sent from the terminal device, the device characteristic information being generated by the terminal device based on the current user identifier, the first public key, the first random number and a device identifier of the terminal device. The identifying unit 505 is configured to identify the terminal device based on the current user identifier, the first random number and the device characteristic information.

In this embodiment, specific processes of the request receiving unit 501, the acquiring unit 502, the sending unit 503, the information receiving unit 504 and the identifying unit 505 of the apparatus 500 for identifying a device of a server may respectively refer to related description of Step 201, Step 202, Step 203, Step 204 and Step 205 in corresponding embodiments in FIG. 2, which are not repeated any more herein.

In some optional implementations of this embodiment, the device identification request may further comprise a identification type identifier, wherein the identification type identifier is used for indicating a device identification type, in the server, of the terminal device. The identifying unit 505 may be further configured to identify the terminal device according to the device identification type of the terminal device, the current user identifier, the first random number and the device characteristic information.

In some optional implementations of this embodiment, the identifying unit 505 may comprise: a resolving module (not shown), configured to resolve the device characteristic information to obtain a user identifier and a random number; a determining module, configured to determine whether the user identifier obtained by resolving is identical to the current user identifier and whether the random number obtained by resolving is identical to the first random number; and a generating module (not shown), configured to generate a identification result indicating a failed identification for the device identification request, in response to determining that the user identifier obtained by resolving is different from the current user identifier and/or the random number obtained by resolving is different from the first random number.

In some optional implementations of this embodiment, the resolving module may be further configured to resolve the device characteristic information by using a preset asymmetric decryption algorithm and a private key in the preset asymmetric key pair to obtain the user identifier, the random number and the device identifier.

In some optional implementations of this embodiment, the identifying unit 505 may further comprise: a identifying module (not shown), configured to identify the terminal device based on the current user identifier, the first random number and the device identifier obtained by resolving, in response to determining that the user identifier obtained by resolving is identical to the current user identifier and the random number obtained by resolving is identical to the first random number.

Figure 6:
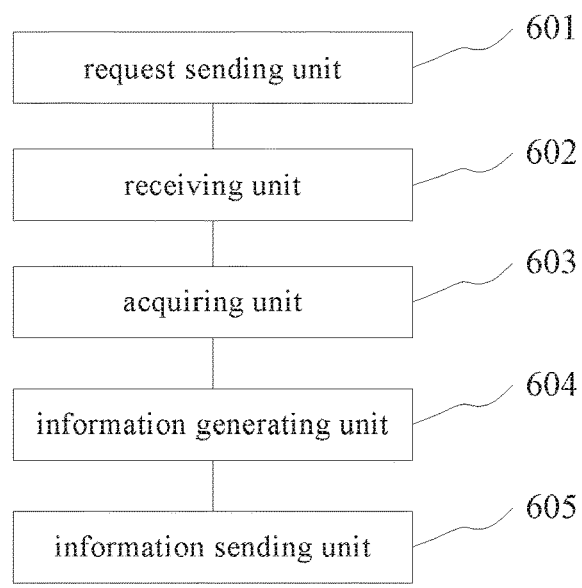
FIG. 6 is a schematic structural diagram of an apparatus for identifying a device of a terminal device according to another embodiment of the present disclosure.

Further referring to FIG. 6, as an implementation of the method as shown in the foregoing figures, the present disclosure provides an embodiment of an apparatus for identifying a device of a terminal device. The apparatus embodiment corresponds to the method embodiment as shown in FIG. 4, and the apparatus specifically may be used in various electronic devices.

As shown in FIG. 6, the apparatus 600 for identifying a device of a terminal device described in this embodiment comprises: a request sending unit 601, a receiving unit 602, an acquiring unit 603, an information generating unit 604 and an information sending unit 605. The request sending unit 601 is configured to send a device identification request to a server, the device identification request comprising a current user identifier of a current user of a terminal device. The receiving unit 602 is configured to receive a first public key and a first random number sent from the server, the first public key being acquired by the server from a preset asymmetric key pair, the first random number being randomly generated by the server. The acquiring unit 603 is configured to acquire a device identifier of the terminal device. The information generating unit 604 is configured to generate device characteristic information based on the current user identifier, the first public key, the first random number and the device identifier. The information sending unit 605 is configured to send the device characteristic information to the server, so that the server identifies the terminal device based on the current user identifier, the first random number and the device characteristic information.

In some optional implementations of this embodiment, the device identification request further comprises a identification type identifier, wherein the identification type identifier is used for indicating a device identification type, in the server, of the terminal device. The information generating unit 604 may be further configured to generate the device characteristic information based on the device identification type of the terminal device, the current user identifier, the first public key, the first random number and the device identifier.

In some optional implementations of this embodiment, the information generating unit 604 may comprise: a first calculating module (not shown), configured to calculate a first digest value by utilizing a preset message digest algorithm based on the device identification type of the terminal device, the first public key and the device identifier; a second calculating module (not shown), configured to calculate a second digest value of the first digest value and the first random number by utilizing the preset message digest algorithm; an encrypting module (not shown), configured to encrypt the first digest value, the current user identifier and the first random number by using the first public key with a preset asymmetric encryption algorithm to obtain encrypted information; and a combining module (not shown), configured to combine the current user identifier, the second digest value and the encrypted information to generate the device characteristic information.

Figure 7:
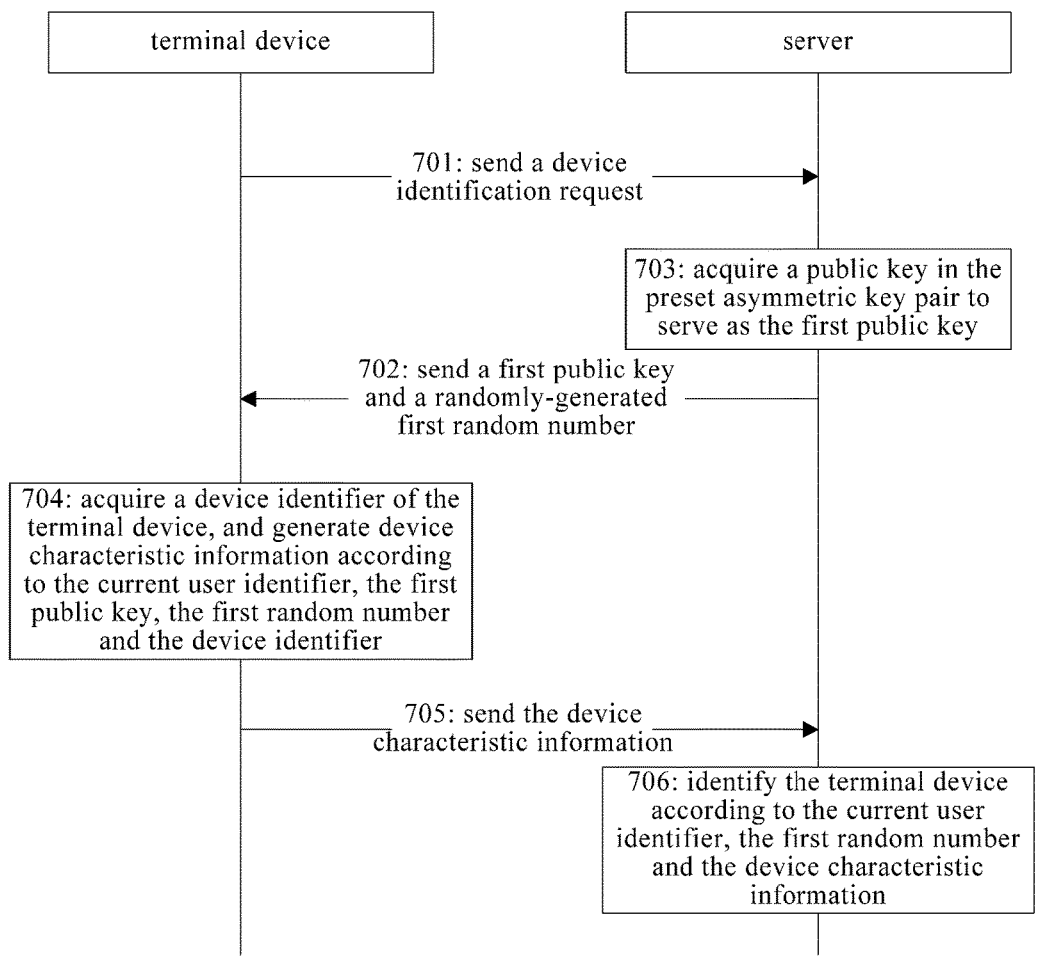
FIG. 7 is a timing diagram of a system for identifying a device according to an embodiment of the present disclosure.

Referring to FIG. 7, a timing sequence 700 of a system for identifying a device according to an embodiment of the present disclosure is illustrated. As shown in FIG. 7, the system for identifying a device of this embodiment comprises a terminal device and a server. The server may comprise the apparatus 500 for identifying a device of a server as shown in FIG. 5. The terminal device may comprise the apparatus 600 for identifying a device of a terminal device as shown in FIG. 6. The main process of the timing sequence between the terminal device and the server in this embodiment is as below: the terminal device sends a device identification request to the server; in response to receiving the device identification request sent by the terminal device, the server acquires a public key in a preset asymmetric key pair to serve as a first public key, and then sends the first public key and a randomly-generated first random number to the terminal device; in response to receiving the first public key and the first random number sent by the server, the terminal device first acquires a device identifier of the terminal device, then generates device characteristic information according to the current user identifier, the first public key, the first random number and the device identifier, and sends the device characteristic information to the server; and the server first receives the device characteristic information sent by the terminal device, and then identifies the terminal device according to the current user identifier, the first random number and the device characteristic information. Specifically, in Step 701, the terminal device sends a device identification request to the server.

In this embodiment, specific operations of Step 701 may refer to related description of the embodiment as shown in FIG. 4, which are not repeated any more herein.

In Step 702, in response to receiving the device identification request sent from the terminal device, the server acquires a public key in the preset asymmetric key pair to serve as the first public key.

In this embodiment, specific operations of Step 702 may refer to related description of the embodiment as shown in FIG. 2, which are not repeated any more herein.

In Step 703, the server sends the first public key and a randomly-generated first random number to the terminal device.

In this embodiment, specific operations of Step 703 may refer to related description of the embodiment as shown in FIG. 2, which are not repeated any more herein.

In Step 704, the terminal device sends the device characteristic information to the server according to the current user identifier, the first public key, the first random number and the device identifier.

In this embodiment, specific operations of Step 704 may refer to related description of the embodiment as shown in FIG. 4, which are not repeated any more herein.

In Step 705, the terminal device sends the device characteristic information to the server.

In this embodiment, specific operations of Step 705 may refer to related description of the embodiment as shown in FIG. 4, which are not repeated any more herein.

In Step 706, the server identifies the terminal device according to the current user identifier, the first random number and the device characteristic information.

In this embodiment, specific operations of Step 706 may refer to related description of the embodiment as shown in FIG. 2 and the embodiment as shown in FIG. 3, which are not repeated any more herein.

According to the system for identifying a device provided by this embodiment, in response to receiving a device identification request sent by the terminal device, the server sends the public key in the preset asymmetric key pair and the randomly generated random number to the terminal device, and then the terminal device generates and sends device identification information for identifying the terminal device to the server, so that the server identifies the terminal device. In this way, security of accessing the server by the terminal device is enhanced.

Figure 8:
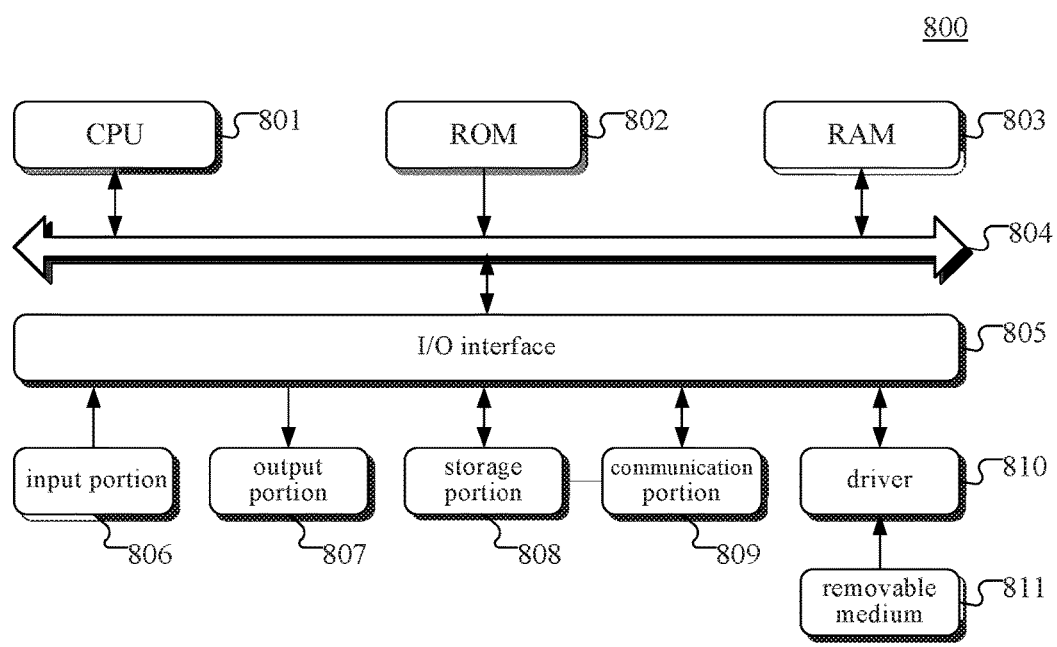
FIG. 8 illustrates a structural schematic diagram of a computer system adapted to implement a terminal device or a server of the embodiments of the present disclosure.

Referring to FIG. 8, a schematic structural diagram of a computer system 800 adapted to implement a terminal apparatus or a server of the embodiments of the present disclosure is shown.

As shown in FIG. 5, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 comprising a cathode ray tube (CRT), a liquid crystal display device (LCD), a speaker etc.; a storage portion 808 including a hard disk and the like; and a communication portion 809 comprising a network interface card, such as a LAN card and a modem. The communication portion 809 performs communication processes via a network, such as the Internet. A driver 810 is also connected to the I/O interface 805 as required. A removable medium 811, such as a magnetic disk, an optical disk, a magneto-optical disk, and a semiconductor memory, may be installed on the driver 810, to facilitate the retrieval of a computer program from the removable medium 811, and the installation thereof on the storage portion 808 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 809, and/or may be installed from the removable media 811. The computer program, when executed by the CPU 801, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising a request receiving unit, an acquiring unit, a sending unit, an information receiving unit, and a identifying unit, where the names of these units or modules are not considered as a limitation to the units or modules. For example, the identifying unit may also be described as "a unit for identifying a device".

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: receive a device identification request sent from a terminal device, the device identification request comprising a current user identifier of a current user of the terminal device; acquire a public key in a preset asymmetric key pair to serve as a first public key; send the first public key and a randomly-generated first random number to the terminal device; receive device characteristic information sent from the terminal device, the device characteristic information being generated by the terminal device based on the current user identifier, the first public key, the first random number and a device identifier of the terminal device; and identify the terminal device based on the current user identifier, the first random number and the device characteristic information.

In another aspect, the present disclosure further provides a non-transitory computer storage medium. The non-transitory computer storage medium may be the non-transitory computer storage medium included in the apparatus in the above embodiments, or a stand-alone non-transitory computer storage medium which has not been assembled into the apparatus. The non-transitory computer storage medium stores one or more programs. The one or more programs, when executed by a device, cause the device to: send a device identification request to a server, the device identification request comprising a current user identifier of a current user of a terminal device; receive a first public key and a first random number sent from the server, the first public key being acquired by the server from a preset asymmetric key pair, the first random number being randomly generated by the server; acquire a device identification of the terminal device; generate device characteristic information based on the current user identifier, the first public key, the first random number and the device identifier; and send the device characteristic information to the server, so that the server identifies the terminal device based on the current user identifier, the first random number and the device characteristic information.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A server-implemented method for identifying a device, comprising:
   receiving a device identification request sent from a terminal device, the device identification request comprising a current user identifier of a current user of the terminal device;
   acquiring a public key in a preset asymmetric key pair to serve as a first public key;
   sending the first public key and a randomly-generated first random number to the terminal device;
   receiving device characteristic information sent from the terminal device, the device characteristic information being generated by the terminal device based on a type of the terminal device, the current user identifier, the first public key, the first random number and a device identifier of the terminal device,
   the device characteristic information including the current user identifier, a second digest value, and encrypted information,
   the encrypted information being a first digest value, the current user identifier, and a first random number encrypted according to a preset asymmetric encryption algorithm,
   the first digest value being calculated utilizing a preset message digest algorithm based on the device identification type of the terminal device, the first public key, and the device identifier, and
   the second digest value being calculated from the first digest value and the first random number utilizing a preset message digest algorithm; and
   identifying the terminal device based on the current user identifier, the first random number and the device characteristic information.

2. The method according to claim 1, wherein the device identification request further comprises an identification type identifier used for indicating a device identification type of the terminal device in the server; and
   the identifying the terminal device based on the current user identifier, the first random number and the device characteristic information comprises:
   identifying the terminal device based on the device identification type of the terminal device, the current user identifier, the first random number and the device characteristic information.

3. The method according to claim 1, wherein the identifying the terminal device based on the current user identifier, the first random number and the device characteristic information comprises:
   resolving the device characteristic information to obtain a user identifier and a random number;
   determining whether the user identifier obtained by resolving is identical to the current user identifier and whether the random number obtained by resolving is identical to the first random number; and
   generating an identification result indicating a failed identification for the device identification request, in response to determining that the user identifier obtained by resolving is different from the current user identifier and/or the random number obtained by resolving is different from the first random number.

4. The method according to claim 3, wherein the resolving the device characteristic information to obtain a user identifier and a random number comprises:
   resolving the device characteristic information by using a preset asymmetric decryption algorithm and a private key in the preset asymmetric key pair to obtain the user identifier, the random number and the device identifier.

5. The method according to claim 3, wherein the identifying the terminal device based on the current user identifier, the first random number and the device characteristic information further comprises:
   identifying the terminal device based on the current user identifier, the first random number and the device identifier obtained by resolving, in response to determining that the user identifier obtained by resolving is identical to the current user identifier and the random number obtained by resolving is identical to the first random number.

6. A terminal-implemented method for identifying a device, comprising:
- sending a device identification request to a server, the device identification request comprising a current user identifier of a current user of a terminal device;
- receiving a first public key and a first random number sent from the server, the first public key being acquired by the server from a preset asymmetric key pair, the first random number being randomly generated by the server;
- acquiring a device identifier of the terminal device;
- generating device characteristic information based on a type of the terminal device, the current user identifier, the first public key, the first random number, and the device identifier, the generating device characteristic information comprising:
  - calculating a first digest value by utilizing a preset message digest algorithm based on the device identification type of the terminal device, the first public key and the device identifier,
  - calculating a second digest value of the first digest value and the first random number by utilizing the preset message digest algorithm,
  - encrypting the first digest value, the current user identifier and the first random number by using the first public key with a preset asymmetric encryption algorithm to obtain encrypted information, and
  - combining the current user identifier, the second digest value and the encrypted information to generate the device characteristic information; and
- sending the device characteristic information to the server, so that the server identifies the terminal device based on the current user identifier, the first random number and the device characteristic information.

7. An apparatus for identifying a device for a server, comprising:
- at least one processor; and
- a memory storing instructions, which when executed by the at least one processor, cause the at least one processor to perform operations, the operations comprising:
- receiving a device identification request sent from a terminal device, the device identification request comprising a current user identifier of a current user of the terminal device;
- acquiring a public key in a preset asymmetric key pair to serve as a first public key;
- sending the first public key and a randomly-generated first random number to the terminal device;
- receiving device characteristic information sent from the terminal device, the device characteristic information being generated by the terminal device based on a type of the terminal device, the current user identifier, the first public key, the first random number, and the device identifier,
  - the device characteristic information including the current user identifier, a second digest value, and encrypted information,
  - the encrypted information being a first digest value, the current user identifier, and a first random number encrypted according to a preset asymmetric encryption algorithm,
  - the first digest value being calculated utilizing a preset message digest algorithm based on the device identification type of the terminal device, the first public key, and the device identifier, and
  - the second digest value being calculated from the first digest value and the first random number utilizing a preset message digest algorithm; and
- identifying the terminal device based on the current user identifier, the first random number and the device characteristic information.

8. The apparatus according to claim 7, wherein the device identification request further comprises an identification type identifier used for indicating a device identification type of the terminal device in the server; and
the identifying the terminal device based on the current user identifier, the first random number and the device characteristic information comprises:
- identify the terminal device based on the device identification type of the terminal device, the current user identifier, the first random number and the device characteristic information.

9. The apparatus according to claim 7, wherein the identifying the terminal device based on the current user identifier, the first random number and the device characteristic information comprises:
- resolving the device characteristic information to obtain a user identifier and a random number;
- determining whether the user identifier obtained by resolving is identical to the current user identifier and whether the random number obtained by resolving is identical to the first random number; and
- generating an identification result indicating a failed identification for the device identification request, in response to determining that the user identifier obtained by resolving is different from the current user identifier and/or the random number obtained by resolving is different from the first random number.

10. The apparatus according to claim 9, wherein the resolving the device characteristic information to obtain a user identifier and a random number comprises:
- resolving the device characteristic information by using a preset asymmetric decryption algorithm and a private key in the preset asymmetric key pair to obtain the user identifier, the random number and the device identifier.

11. The apparatus according to claim 9, wherein the identifying the terminal device based on the current user identifier, the first random number and the device characteristic information further comprises:
- identifying the terminal device based on the current user identifier, the first random number and the device identifier obtained by resolving, in response to determining that the user identifier obtained by resolving is identical to the current user identifier and the random number obtained by resolving is identical to the first random number.

12. An apparatus for identifying a device for a terminal device, comprising:
- at least one processor; and
- a memory storing instructions, which when executed by the at least one processor, cause the at least one processor to perform operations, the operations comprising:
- sending a device identification request to a server, the device identification request comprising a current user identifier of a current user of a terminal device;
- receiving a first public key and a first random number sent from the server, the first public key being acquired by the server from a preset asymmetric key pair, the first random number being randomly generated by the server;

acquiring a device identification of the terminal device;
generating device characteristic information based on a type of the terminal device, the current user identifier, the first public key, the first random number, and the device identifier, the generating device characteristic information comprising:
  calculating a first digest value by utilizing a preset message digest algorithm based on the device identification type of the terminal device, the first public key and the device identifier,
  calculating a second digest value of the first digest value and the first random number by utilizing the preset message digest algorithm,
  encrypting the first digest value, the current user identifier and the first random number by using the first public key with a preset asymmetric encryption algorithm to obtain encrypted information, and
combining the current user identifier, the second digest value and the encrypted information to generate the device characteristic information; and
sending the device characteristic information to the server, so that the server identifies the terminal device based on the current user identifier, the first random number and the device characteristic information.

13. A system for identifying a device, comprising a terminal device and a server, and the terminal device comprising the apparatus according to claim 12, the server comprising:
  at least one server processor; and
  a server memory storing server instructions, which when executed by the at least one server processor, cause the at least one server processor to perform server operations, the server operations comprising:
receiving the device identification request sent from the terminal device;
acquiring a public key in the preset asymmetric key pair to serve as the first public key;
sending the first public key and a randomly-generated first random number to the terminal device;
receiving the device characteristic information sent from the terminal device; and
identifying the terminal device based on the current user identifier, the first random number and the device characteristic information.

\* \* \* \* \*